(12) United States Patent
Kaltenbach et al.

(10) Patent No.: US 9,738,149 B2
(45) Date of Patent: *Aug. 22, 2017

(54) DRIVE UNIT FOR A HYBRID VEHICLE AND METHOD FOR OPERATING THE SAME

(71) Applicant: ZF Friedrichshafen AG, Friedrichshafen (DE)

(72) Inventors: Johannes Kaltenbach, Friedrichshafen (DE); Uwe Griesmeier, Markdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 83 days.

This patent is subject to a terminal disclaimer.

(21) Appl. No.: 14/443,211

(22) PCT Filed: Oct. 10, 2013

(86) PCT No.: PCT/EP2013/071174
§ 371 (c)(1),
(2) Date: Aug. 24, 2015

(87) PCT Pub. No.: WO2014/075854
PCT Pub. Date: May 22, 2014

(65) Prior Publication Data
US 2015/0352942 A1    Dec. 10, 2015

(30) Foreign Application Priority Data

Nov. 15, 2012    (DE) .................. 10 2012 220 827

(51) Int. Cl.
*B60K 6/365*    (2007.10)
*B60K 6/48*    (2007.10)
(Continued)

(52) U.S. Cl.
CPC ............... *B60K 6/48* (2013.01); *B60K 6/365* (2013.01); *B60K 6/387* (2013.01); *B60W 10/02* (2013.01);
(Continued)

(58) Field of Classification Search
CPC ..................................................... B60K 6/365
See application file for complete search history.

(56) References Cited

U.S. PATENT DOCUMENTS 8,430,777 B2 *    4/2013    Yamada .................. B60K 6/365
                                                                    475/284
8,585,523 B2 *    11/2013    Yamada ................. B60K 6/365
                                                                    475/282
(Continued)

FOREIGN PATENT DOCUMENTS

DE    10 2007 042949    4/2009
DE    10 2010 046766    3/2012
DE    10 2010 061841    5/2012

OTHER PUBLICATIONS

German Patent Office Search Report, Aug. 22, 2013.
PCT Search Report and Written Opinion, Dec. 11, 2013.

*Primary Examiner* — Tisha Lewis
(74) *Attorney, Agent, or Firm* — Dority & Manning, P.A.

(57) ABSTRACT

A drive unit for a hybrid vehicle includes a drive assembly with an internal combustion engine and an electric motor, and a transmission featuring several sub-transmissions shifting between the drive assembly and an output. Through a planetary transmission, the electric motor is coupled to an input shaft of a first sub-transmission and an input shaft of a second sub-transmission. Through a separating clutch, the internal combustion engine is to the input shaft of the first sub-transmission and, if the separating clutch is locked, is coupled to the same element of the planetary transmission as the input shaft of the first sub-transmission. A bypass shift (Continued)

element works with the planetary transmission such that, with a locked bypass shift element, a torque-proof connection between the electric motor, the input shaft of the first sub-transmission and the input shaft of the second sub-transmission exist, while, with an open bypass shift element, this torque-proof connection between the electric motor and the two input shafts of the two sub-transmissions does not exist. The separating clutch is formed as a frictional-locking or positive-locking separating clutch, and the bypass shift element is formed as a frictional-locking bypass shift element.

6 Claims, 14 Drawing Sheets

(51) Int. Cl.
*B60W 20/10* (2016.01)
*B60W 10/115* (2012.01)
*B60K 6/387* (2007.10)
*B60W 10/02* (2006.01)
*B60W 10/06* (2006.01)
*B60W 10/08* (2006.01)
*B60W 10/113* (2012.01)
*B60W 20/00* (2016.01)
*B60W 20/40* (2016.01)
*F16H 3/00* (2006.01)

(52) U.S. Cl.
CPC ............ *B60W 10/06* (2013.01); *B60W 10/08* (2013.01); *B60W 10/113* (2013.01); *B60W 10/115* (2013.01); *B60W 20/00* (2013.01); *B60W 20/10* (2013.01); *B60W 20/40* (2013.01); *B60K 2006/4816* (2013.01); *B60W 2710/021* (2013.01); *B60W 2710/0644* (2013.01); *B60W 2710/081* (2013.01); *B60W 2710/1011* (2013.01); *F16H 3/006* (2013.01); *F16H 2200/0056* (2013.01); *F16H 2200/2005* (2013.01); *Y02T 10/6221* (2013.01); *Y02T 10/6256* (2013.01); *Y02T 10/6286* (2013.01); *Y10S 903/91* (2013.01); *Y10S 903/914* (2013.01); *Y10S 903/93* (2013.01); *Y10T 477/26* (2015.01)

(56) References Cited

U.S. PATENT DOCUMENTS

2010/0009805 A1 1/2010 Bachmann
2012/0129638 A1 5/2012 Kaltenbach et al.
2013/0210567 A1 8/2013 Puiu
2013/0288850 A1 10/2013 Kaltenbach

* cited by examiner

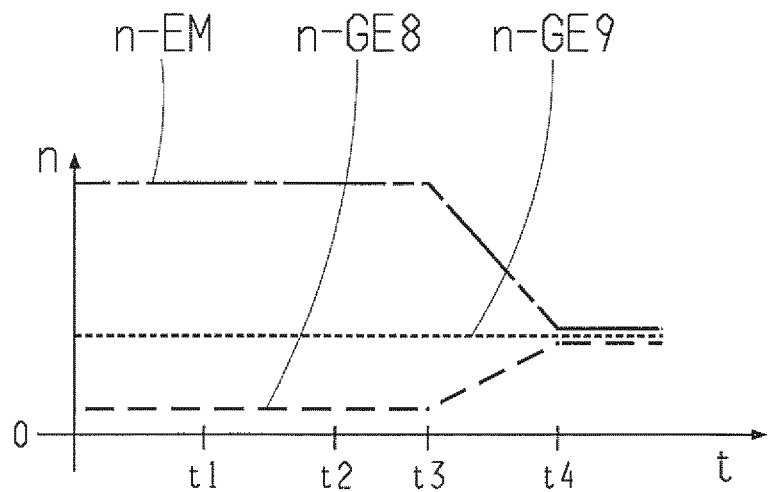
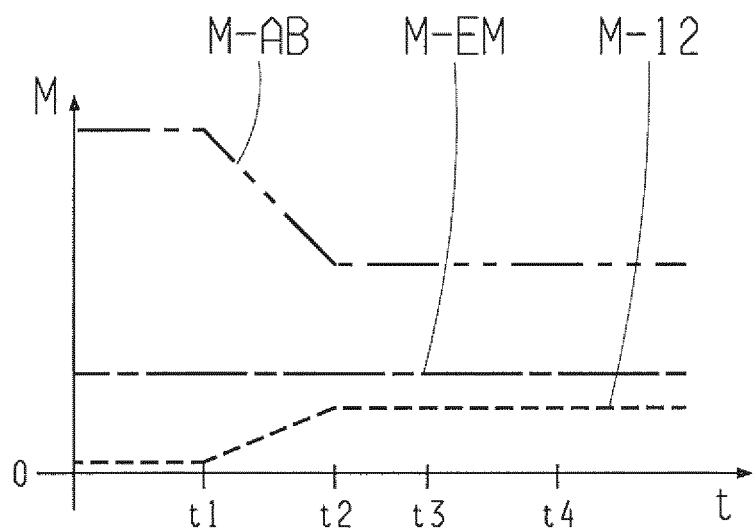
Fig. 4

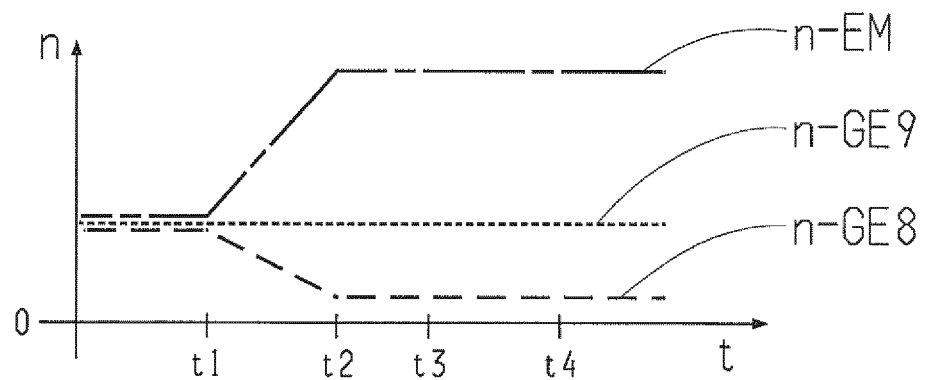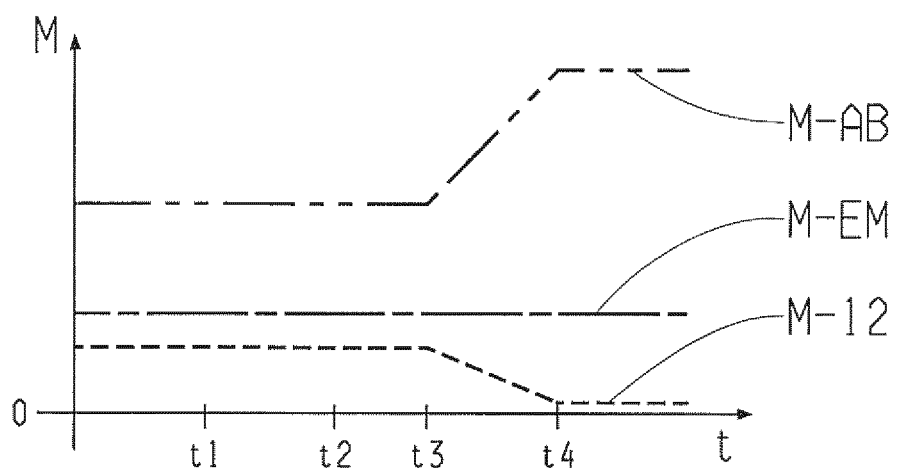
Fig. 5

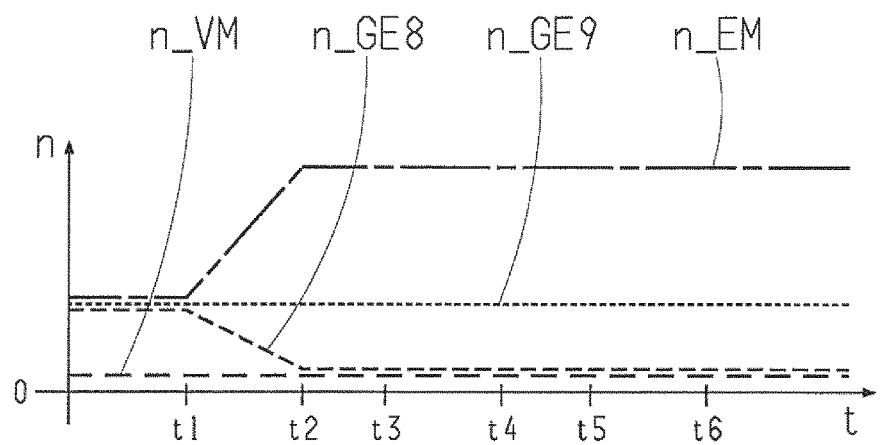
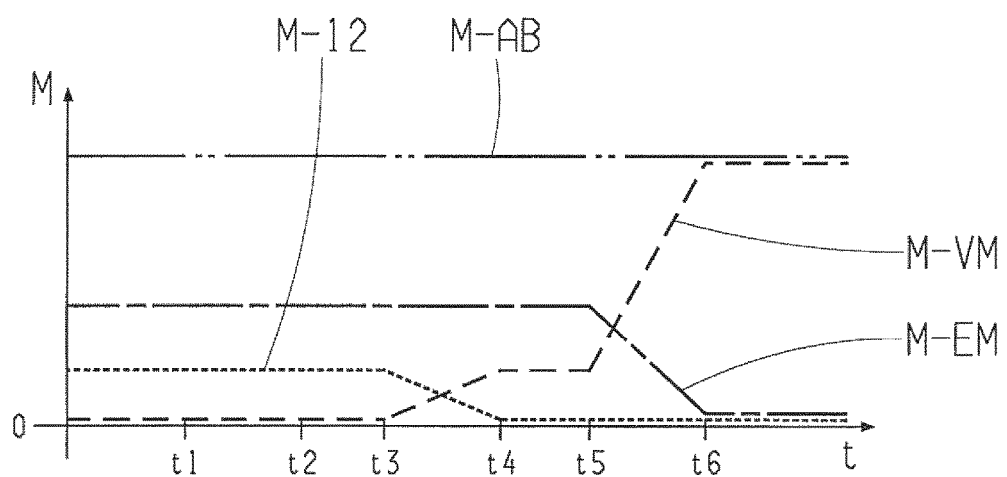
Fig. 7

DRIVE UNIT FOR A HYBRID VEHICLE AND METHOD FOR OPERATING THE SAME

FIELD OF THE INVENTION

The invention relates to a drive unit for a hybrid vehicle and method for operating the same

BACKGROUND

A drive unit for a hybrid vehicle is known from DE 10 2006 059 591 A1, the drive assembly of which includes an internal combustion engine and an electric motor, whereas a transmission is shifted between the drive assembly and an output, which transmission features several sub-transmissions with positive-locking shift elements. The electric motor of the drive assembly is coupled through a planetary transmission to an input shaft of a first sub-transmission and an input shaft of a second sub-transmission shifted in parallel to the first sub-transmission. Through a separating clutch, which is designed as a frictional-locking separating clutch, the internal combustion engine is able to be coupled to the input shaft of the first sub-transmission. If the separating clutch is locked, the internal combustion engine is coupled to the same element of the planetary transmission, as with the input shaft of the first sub-transmission.

An additional drive unit for a hybrid vehicle is known from DE 10 2010 061 841 A1, whereas the drive unit of DE 10 2010 061 841 A1 differs from the drive unit of DE 10 2006 059 591 A1 by the fact that a bypass shift element also works together with the planetary transmission. The bypass shift element comprises a positive-locking bypass shift element, whereas, if the bypass shift element is locked, there is a torque-proof connection between the electric motor and the input shafts of the two sub-transmissions and thus a mandatory equality of rotational speed between the same. By contrast, if the bypass shift element is open, this torque-proof connection between the electric motor and the two input shafts of the sub-transmissions does not exist.

The drive units of the state of the art have the disadvantage that, in all-electric driving mode of the hybrid car, power shifts are not possible.

SUMMARY OF THE INVENTION

Based on this, the present invention is subject to a task of creating a new drive unit for a hybrid vehicle and a method for operating the same. Additional objects and advantages of the invention will be set forth in part in the following description, or may be obvious from the description, or may be learned through practice of the invention.

This problem is solved by a drive unit for a hybrid vehicle as set forth herein. In accordance with the invention, the separating clutch is a frictional-locking or positive-locking separating clutch, whereas a bypass shift element is formed as a frictional-locking bypass shift element.

With the drive unit for a hybrid vehicle in accordance with the invention, power shifts can be executed in all-electric driving mode, although gear shift elements of the two sub-transmissions of the transmission are designed in a positive-locking manner.

If the separating clutch is positive-locking, a coupling of the internal combustion engine is possible, even if the rotational speed of the internal combustion engine is actually too high.

A first method in accordance with the invention for operating the drive unit for a hybrid vehicle provides that, for the execution of a power shift in all-electric driving mode, the frictional-locking bypass shift element is used as a power-shifting element, that is, upon the execution of a drive upshift and upon the execution of a coast downshift, as a power-shifting element to be switched on or locked and, upon the execution of a drive downshift and upon the execution of a coast upshift, as a power-shifting element to be switched off or opened.

This first method in accordance with the invention for operating the drive unit in accordance with the invention serves the purpose of executing power shifts in all-electric mode. In accordance with the invention, the frictional-locking bypass shift element, which does not comprise a gear shift element, is used as a power-shifting element. According to one realization of the invention, a power shift in all-electric mode of the drive unit is to be executed with the assistance of a frictional-locking bypass shift element of the planetary transmission.

A second method in accordance with the invention for operating the drive unit for a hybrid vehicle provides that, for the coupling of the internal combustion engine with a positive-locking separating clutch with the assistance of the frictional-locking bypass shift element, the rotational speed of the input shaft of the first sub-transmission is synchronized to the rotational speed of the internal combustion engine while maintaining pulling force at the output.

The second method in accordance with the invention serves the purpose of coupling the internal combustion engine. Even if the rotational speed of the internal combustion engine is actually too high and is not suitable for the current gear in the second sub-transmission, with the assistance of the second method in accordance with the invention, the internal combustion engine can be coupled despite a positive-locking separating clutch.

BRIEF DESCRIPTION OF THE DRAWINGS

Preferred additional embodiments arise from the following description. Embodiments of the invention are, without any limitation, more specifically described by means of the drawing. Thereby, the following is shown:

FIG. 4 is diagrams for the further illustration of the all-electric drive upshift;

FIG. 5 is diagrams for the illustration of the all-electric drive downshift;

FIG. 7 is diagrams for the further illustration of the coupling of the internal combustion engine with all-electric driving;

DETAILED DESCRIPTION

Figure 1:
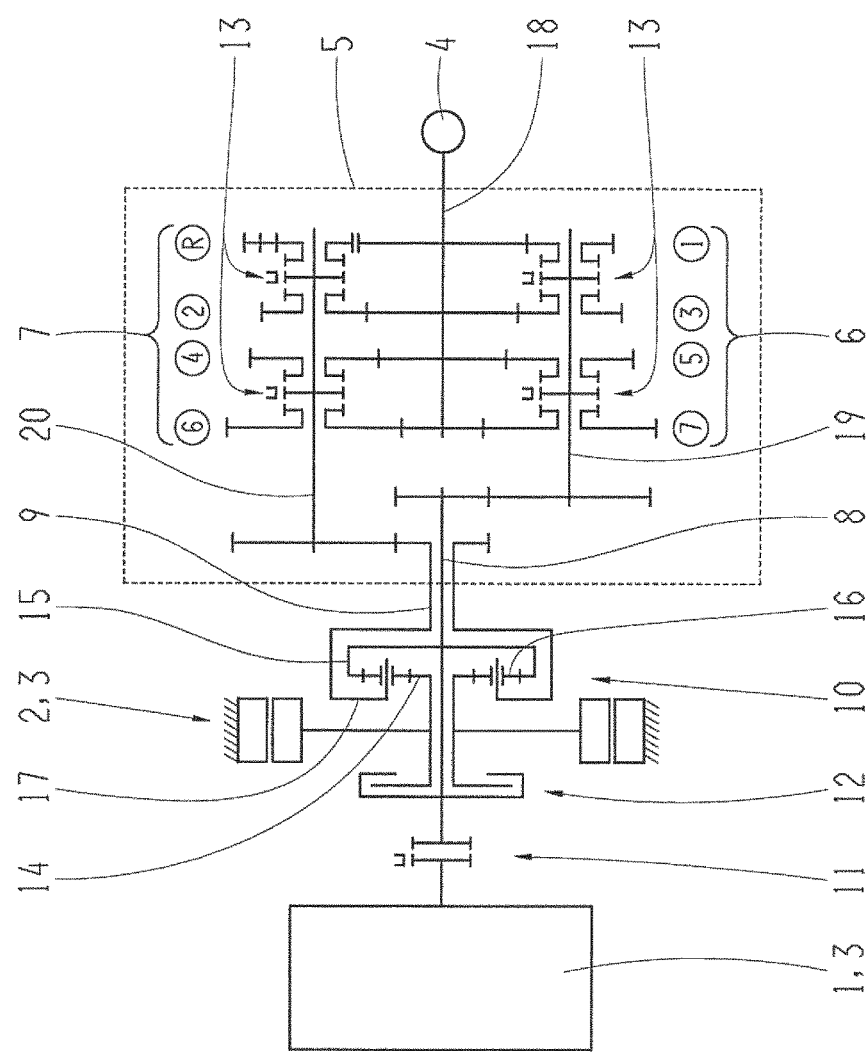
FIG. 1 is a schematic diagram of a first drive unit for a hybrid vehicle.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 shows a schematic diagram of a drive unit for a hybrid vehicle. The drive unit of FIG. 1 includes a drive assembly 3 formed by an internal combustion engine 1 and an electric motor 2, whereas a transmission 5 is shifted between the drive assembly 3 and an output 4.

The transmission 5 includes two sub-transmissions 6 and 7, which are shifted, for all intents and purposes, parallel to each other. The embodiment shown, the first sub-transmission 6 provides the forward gears "1", "3", "5" and "7", while the second sub-transmission 7 provides the forward gears "2", "4", "6", and the reverse gear "R". The gear set shown in FIG. 1 of the sub-transmissions 6 and 7 and the shown distribution of gears on the same is of an exemplary nature.

For providing the forward gears and the reverse gear, the sub-transmissions 6 and 7 of the transmission 5 include positive-locking shift elements 13, which form the gear shift elements of the transmission 5. The structure and the arrangement of the sub-transmissions 6 and 7 are known from dual-clutch transmissions and are familiar to those skilled in the art.

It should be noted that each sub-transmission 6, 7 includes a respective input shaft 8, 9, which, depending on the shifting state of the shift elements 13, are selectively coupled through an output shaft 18 with the output 4. An input shaft 9 of the sub-transmission 7 is designed as a hollow shaft, in which the other input shaft 8 of the other sub-transmission 6 runs in a coaxial manner. The shift elements 13 of the sub-transmissions 6 and 7 are allocated to lay shafts 19 and 20 of the sub-transmissions 6 and 7.

Through a planetary transmission 10, the electric motor 2 of the drive assembly 3 engages at an input shaft 8 of the first sub-transmission 6 and at an input shaft 9 of the second sub-transmission 7. On the input shaft 8 of the first sub-transmission 6, the internal combustion engine 1 of the drive assembly 3 is able to be directly coupled through a separating clutch 11, whereas, with a locked separating clutch 11, through the planetary transmission 10, the internal combustion engine 1 is further indirectly coupled to the input shaft 9 of the second sub-transmission 7.

Of the planetary transmission 10, a sun gear 14, a ring gear 15, planetary gears 16 and a bar or planetary carrier 17 are shown in FIG. 1. The planetary carrier 17 engages at the input shaft 9 of the second sub-transmission 7. The electric motor 2 of the drive assembly 3 is coupled to the sun gear 14 of the planetary gear 10. With a locked separating clutch 11, the internal combustion engine 1, as with the input shaft 8 of the first sub-transmission 6, is coupled to the ring gear 15. If the separating clutch 11 is locked, the internal combustion engine 1 and the input shaft 8 of the first sub-transmission 6 always engage at the same element of the planetary transmission 10.

A bypass shift element 12 works together with the planetary transmission 10 in such a manner that, with a locked bypass shift element 12, a torque-proof connection between the electric motor 2, the input shaft 9 of the second sub-transmission 7 and the input shaft 8 of the first sub-transmission 6, and thus a mandatory equality of rotational speed between the same, exist, while, with an open bypass shift element 12, this torque-proof connection between the electric motor 2 and the two input shafts 8, 9 of the two sub-transmissions 6, 7, and thus the mandatory equality of rotational speed, do not exist.

The bypass shift element 12 comprises a frictional-locking bypass shift element 12. According to a preferred embodiment of the invention, the separating clutch 11 comprises a positive-locking separating clutch 11.

A first method in accordance with the invention for operating such a drive unit relates to the execution of a power shift in all-electric driving mode of the drive unit, whereas, in accordance with the invention, the frictional-locking bypass shift element 12 is used as a power-shifting element for this purpose.

It is a realization of the invention that, if all gear shift elements of the transmission 5, thus all shift elements 13, are designed as positive-locking shift elements, in electric driving mode, a power shift can be executed through the frictional-locking bypass shift element 12 of the planetary transmission 10.

Thereby, upon the execution of a drive upshift or upon the execution of a coast downshift, the bypass shift element 12 is used as a power-shifting element to be switched on or locked. Upon the execution of a drive downshift or a coast upshift, the frictional-locking bypass shift element 12 is used as a power-shifting element to be switched off or opened.

Figure 2:
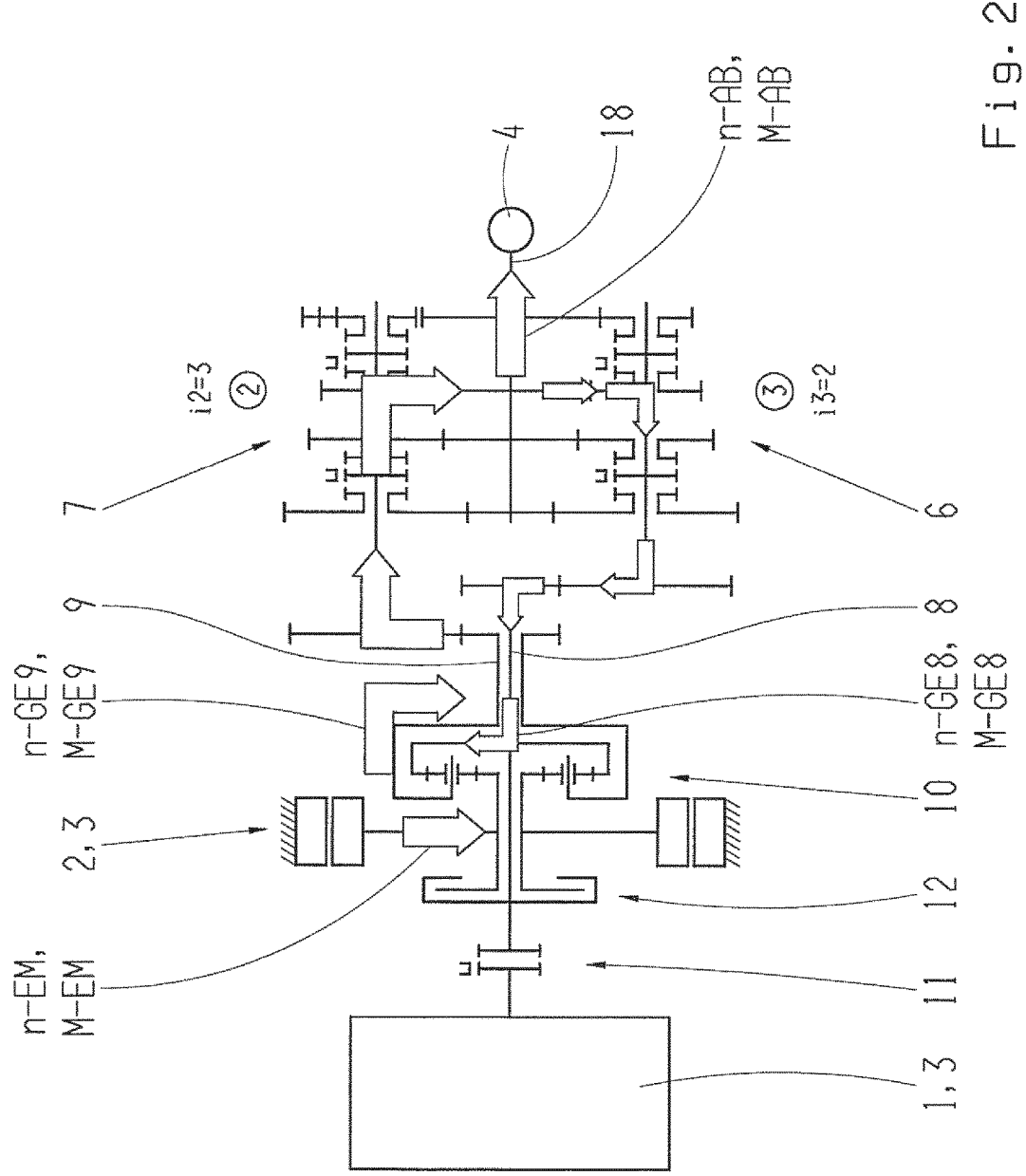
FIG. 2 is the schematic diagram of FIG. 1 for the illustration of an all-electric driving mode.

FIG. 2 illustrates a torque flow through the drive unit of FIG. 1 upon an all-electric driving mode, whereas, in FIG. 2, both the positive-locking separating clutch 11 and the frictional-locking bypass shift element 12 are open. Furthermore, one gear is engaged in both sub-transmissions 6, 7; that is, the third gear in the first sub-transmission 6 and the second gear in the second sub-transmission 7. Under the assumption of the interconnection, as shown in FIG. 2, of the electric motor 2 along with the two input shafts 8 and 9 of the two sub-transmissions 6 and 7 with the elements of the planetary transmission 10 and under the additional assumption of a stationary transmission ratio i0 of −2.0, a transmission ratio i2 of the second gear in the second sub-transmission 7 of 3.0 and a transmission ratio i3 of the third gear in the first sub-transmission 6 of 2.0, a transmission ratio of 5.0 arises for the transmission ratio of the electric motor 2, whereas the electric motor 2 rotates 1.67 times faster than the input shaft 9 of the second sub-transmission 7. Thereby, idle power flows through the first sub-transmission 6 and the planetary transmission 10.

In accordance with FIG. 2, from the electric motor 2 and accordingly through the sun gear 14 of the planetary transmission 10, power flows from the electric motor 2 through the second transmission 7 to the output 4. However, one part of the power of the electric motor 2 flows from the output shaft 18 through the first sub-transmission 6 back to the planetary transmission 10; that is, in the ring gear 15 of the same. This part of the power constitutes idle power.

In this case of the electric method, FIG. 2 illustrates rotational speeds and turning moments, whereas, under the assumption that the electric motor 2 turns with a rotational speed n-EM of 3500 rotations per minute (rpm) and provides a torque M-EM of 100 Nm, a rotational speed n-AB of 700 rpm and a turning moment of 500 Nm are applied at the output shaft 18 and accordingly at the output 4. In this case, the rotational speed n-GE9 of the transmission input shaft 9 of the second sub-transmission 7 amounts to 2100 rpm, and, in this case, the turning moment M-G 9 to be transferred by the same amounts to 300 Nm. In this case, the rotational speed n-GE8 of the input shaft 8 of the first sub-transmission 6 amounts to 1400 rpm and the turning moment M-GE8 transferred by the same amounts to 200 Nm.

It follows that, for this case of the electric method, the electric motor 2 provides power of approximately 35 kW, which is also applied at the output 4, whereas the idle power flowing through the sub-transmission 6 amounts to approximately 28 kW.

Figure 3:
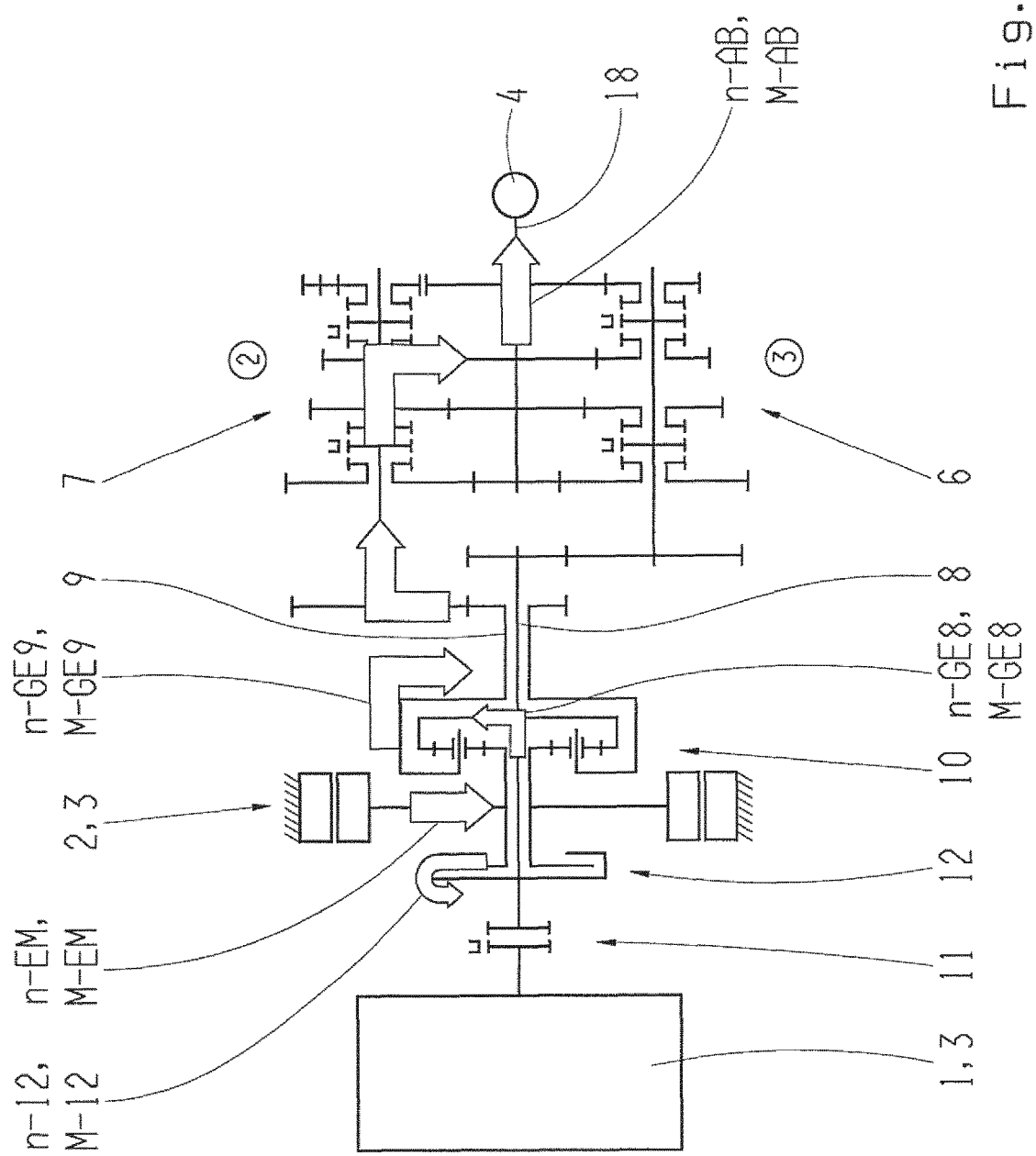
FIG. 3 is the schematic diagram of FIG. 1 for the illustration of an all-electric drive upshift.

If, upon all-electric driving mode, a power shift is then executed, as already stated, the frictional-locking bypass shift element 12 is used as a power-shifting element, whereas, for the case of a drive upshift in all-electric driving mode, FIGS. 3 and 4 visualize rotational speeds n and turning moments M for the execution of the power drive upshift.

In the initial state with all-electric driving, thus in FIG. 4 prior to the point in time t1, the frictional-locking bypass shift element 12 and the positive-locking separating clutch 11 are both open. Furthermore, one gear is engaged in each of the two sub-transmissions 6, 7; that is, in the embodiment shown, the third gear in the first sub-transmission 6 and the second gear in the second sub-transmission 7.

For the execution of the power drive upshift, initially between the points in time t1 and t2, a load transfer is carried out by the frictional-locking bypass shift element 12; that is, for the unloading of the first sub-transmission 6. Whereas, in accordance with FIG. 4, the torque M-AB taking effect at the output is thereby decreased and the torque M-12 of the bypass shift element 12 is thereby increased. The torque M-AB taking effect at the output decreases by one gear jump.

Thereupon, the gear of the first sub-transmission 6 is disengaged between the points in time t2 and t3, whereas, an adjustment to the rotational speed thereupon takes place between the points in time t3 and t4. In accordance with FIG. 4, the rotational speed n-EM of the electric motor 2 is reduced between the points in time t3 and t4, whereas the rotational speed n-GE8 of the input shaft 8 of the first sub-transmission 6 increases. Due to this adjustment to the rotational speed, the frictional-locking bypass shift element 12 is synchronized and subsequently locked. At the point in time t4, the execution of the power drive upshift is completed.

Under the assumption that the rotational speed n-EM of the electric motor 2 amounts to 3500 rpm, and the torque M-EM provided by the same amounts to 100 Nm, as a result of the execution of the power drive upshift, the torque M-AB taking effect at the output is reduced from 500 Nm prior to the point in time t1 to 300 Nm after the point in time t2 with a rotational speed n-AB of 700 rpm. Starting with the point in time t1, until the point in time t2, the torque M-12 to be transferred by the frictional-locking bypass shift element 12 increases to 67 Nm with a slip speed n-12 of 2100 rpm. The power loss at the bypass shift element 12 then amounts to 14 kW. The aforementioned adjustment to the rotational speed takes place between the points of time t2 and t3, whereas, starting with the point in time t3, the rotational speed n-EM of the electric motor 2 is reduced from 3500 rpm to 2100 rpm by the point in time t4; that is, to the rotational speed n-GE9 of the input shaft 9 of the second sub-transmission 7; while, during the same period of time between the points in time t3 and t4, the rotational speed n-GE8 of the input shaft 8 of the first sub-transmission 6 is increased from 700 rpm to 2100 rpm.

As an analogy to the above design of the power drive upshifts, a power coast downshift can also be executed; that is, if the electric motor 2 is in coasting mode (for example, as a result of recuperation).

FIG. 5 illustrates curves of rotational speeds m and turning moments M with the execution of a drive downshift in all-electric driving mode. Prior to the point in time t1, in all-electric driving mode, the frictional-locking bypass shift element 12 is locked, the positive-locking separating clutch 11 is open, one gear is engaged in the second sub-transmission 7 and the first sub-transmission 6 is in neutral. For the execution of the power drive downshift, initially between the points in time t1 and t2, the ability to transfer of the bypass shift element 12 is reduced, until the slip up to the same occurs. The diagram of FIG. 5 shows the turning moment M-12 actually transferred by the bypass shift element 12; as such, this phase is not visible in the diagram of FIG. 5. Through an adjustment to the rotational speed that likewise takes place between the points in time t1 and t2, the first sub-transmission 6 is synchronized to the target gear of the power drive downshift to be executed, whereas, in accordance with FIG. 5, the rotational speed n-EM of the electric motor 2 is increased for this purpose. Thereupon, the gear in the first sub-transmission 6 is engaged between the points in time t2 and t3; whereas, the frictional-locking bypass shift element 12 is open between the points in time t3 and t4. This increases the torque M-AB taking effect on the output 4 by the gear jump. With the point in time t4, the execution of the power drive downshift is completed.

In an analogous manner to the power drive downshift, a power coast upshift can also be executed, whereas, at that point (for example, as a result of a recuperation action), the electric motor 2 in turn is in coasting mode.

An additional method in accordance with the invention for operating the drive unit in accordance with the invention relates to the coupling of the internal combustion engine 1 when coming out of all-electric driving mode, whereas, for this purpose, the coupling of the internal combustion engine 1 takes place through the positive-locking separating clutch 11; that is, in such a manner, with the assistance of the frictional-locking bypass shift element 12, that the rotational speed of the input shaft 8 of the first sub-transmission 6 is synchronized to the rotational speed of the internal combustion engine 1 while maintaining the pulling force at the output 4. Details of this method for the coupling of the internal combustion engine 1 through the positive-locking separating clutch 11 with the assistance of the frictional-locking bypass shift element 12 are described below with reference to FIGS. 6 and 7.

Figure 6:
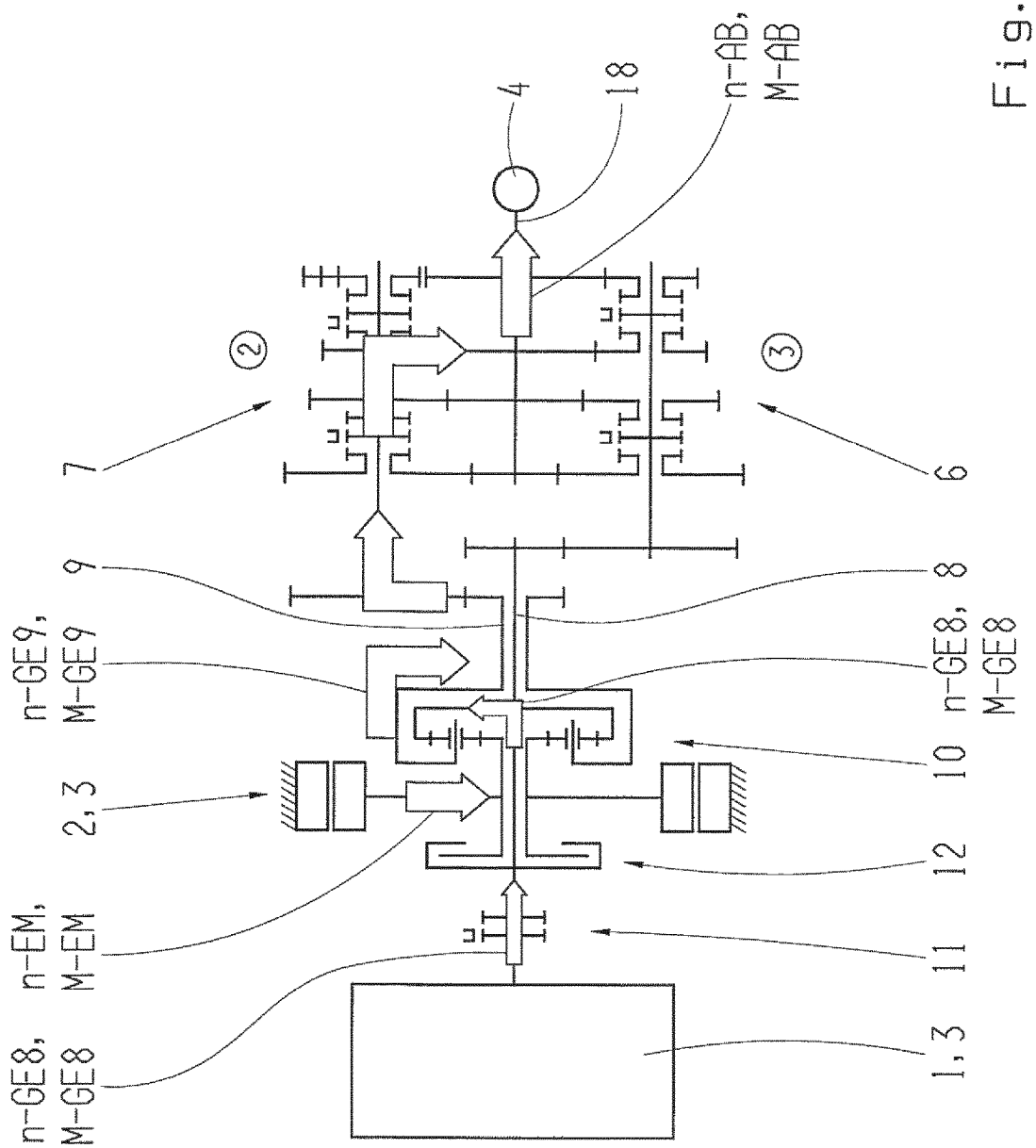
FIG. 6 is the schematic diagram of FIG. 1 for the illustration of a coupling of the internal combustion engine with all-electric driving.

In FIGS. 6 and 7, it is in turn assumed that, with all-electric driving prior to the coupling of the internal combustion engine 1, thus prior to the point in time of t1 in FIG. 7, the separating clutch 11 is open, the frictional-locking shift element 12 is locked, one gear (i.e., the second gear) is engaged in the second sub-transmission 7, while the first sub-transmission 6 is in neutral. In addition, it is assumed that the gear currently engaged in the second sub-transmission 7 is not suitable for the internal combustion engine 1, because, for example, the rotational speed for the internal combustion engine 1 would be too high.

In order to then couple the internal combustion engine 1, initially between the points in time t1 and t2, the ability to transfer of the frictional-locking bypass shift element 12 is reduced, until the slip up to the same occurs; however, this is not visible in FIG. 7, since FIG. 7 shows the turning moment actually transferred by the frictional-locking bypass shift element 12. In addition, an adjustment to the rotational speed takes place between the points in time t1 and t2. Whereas it can be inferred from FIG. 7 that the rotational speed n-GE8 of the input shaft 8 of the first sub-transmission 6 is taken to the rotational speed n-VM of the internal combustion engine 1, that is with the assistance of the electric motor 2, whereas the rotational speed n-EM of the electric motor 2 is increased for this purpose.

Thereupon, the positive-locking separating clutch 11 is locked between the points in time t2 and t3, whereas a load transfer is subsequently carried out by the internal combustion engine 1 between the points in time t3 and t4. Thereby, the frictional-locking bypass shift element 12 is unloaded, which may be inferred from the torque curve M 12 in accordance with FIG. 7 of the bypass shift element 12. Thereupon, between the points in time t4 and t5, a synchronization of the first sub-transmission 6 is carried out to a suitable gear, whereas, in the time diagram of FIG. 7, the gear of the first sub-transmission 6 is already synchronized. Between the points in time t4 and t5, the synchronized or synchronous gear is then engaged in the first sub-transmission 6. Subsequently, a load transfer is carried out through the internal combustion engine 1 between the points in time t5 and t6, whereas the electric motor 2 is then unloaded. Thus, FIG. 7 shows that, between the points in time t5 and t6, the torque M-VM provided by the internal combustion engine 1 further increases, while the torque M-EM provided by the electric motor is reduced.

In the above embodiments, the input shaft 8 of the first sub-transmission 6, just like the internal combustion engine 1, is engaged at the ring gear 15 of the planetary transmission 10 if the separating clutch 11 is locked. The input shaft 9 of the second sub-transmission 7 engages at the bar or the planetary carrier 17 of the planetary transmission 10. The electric motor 2 engages at the sun gear 14 of the planetary transmission 10.

The connection of the internal combustion engine 1, the electric motor 2 and the two sub-transmissions 6 and 7 at the planetary transmission 10 may also be designed differently. However, the internal combustion engine 1 and the input shaft 8 of the first sub-transmission 6 always engage at the same element of the planetary transmission 10.

Figure 8:
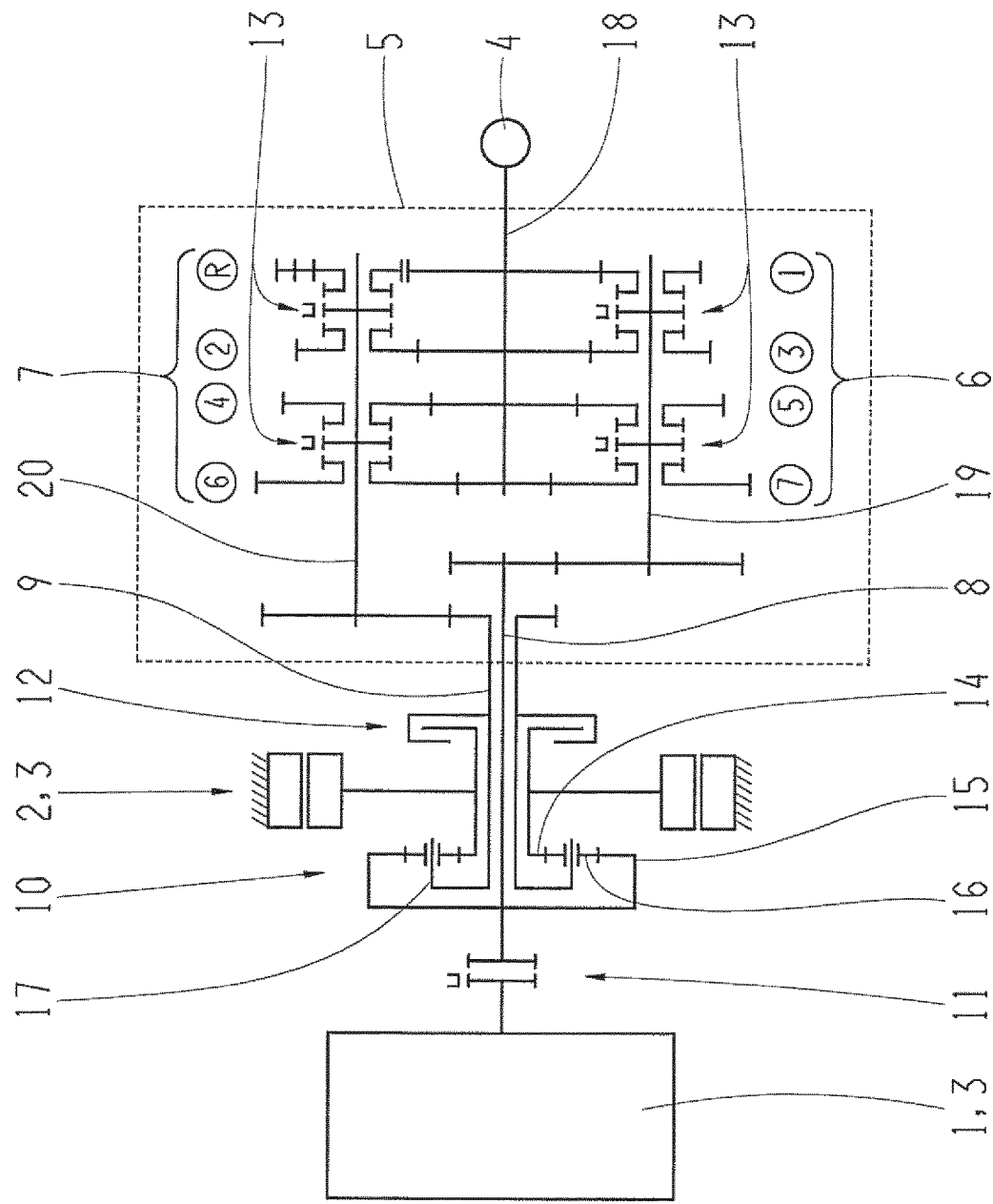
FIG. 8 is a schematic diagram of a second drive unit for a hybrid vehicle.
Figure 9:
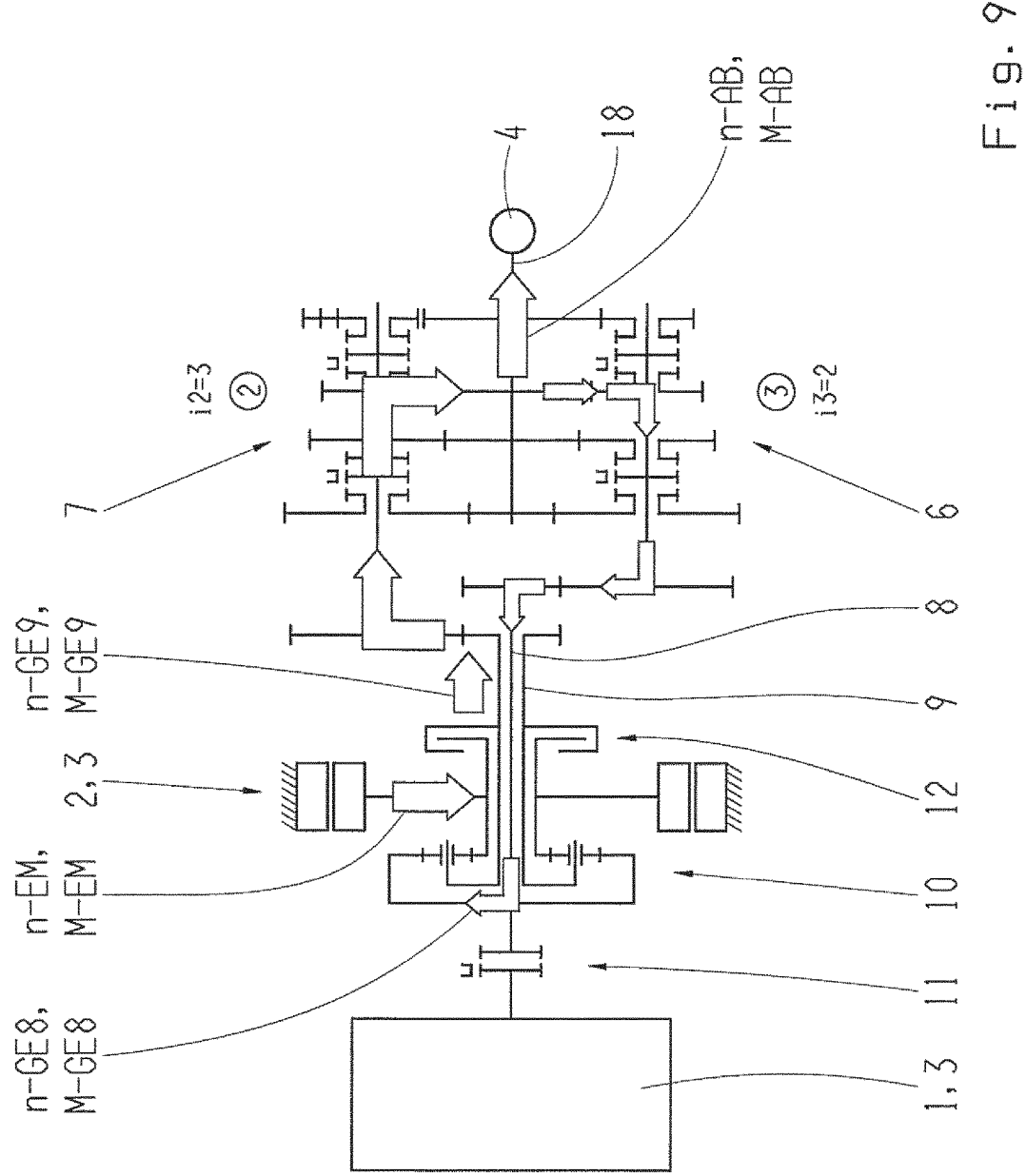
FIG. 9 is the schematic diagram of FIG. 8 for the illustration of an all-electric driving mode.
Figure 10:
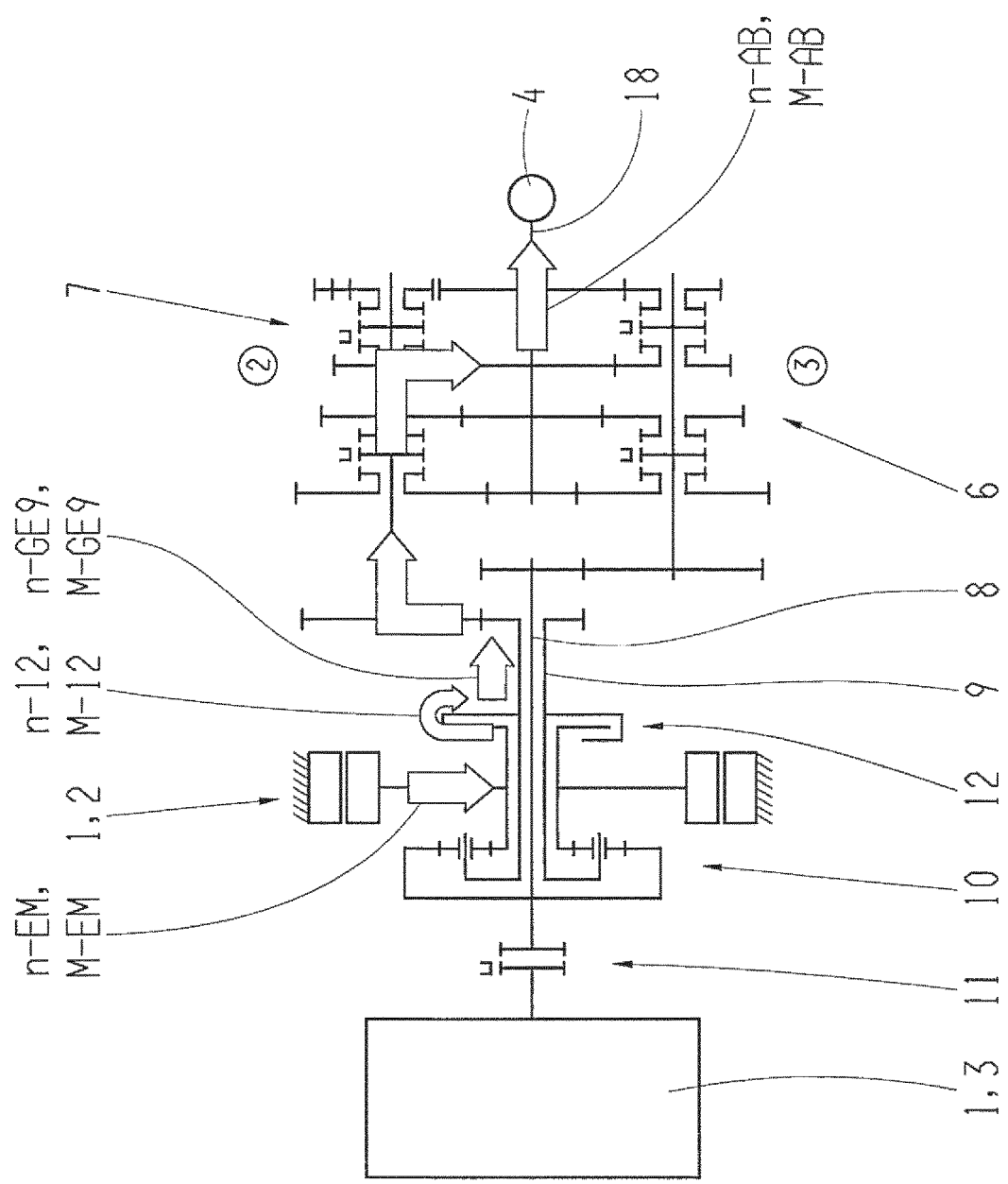
FIG. 10 is the schematic diagram of FIG. 8 for the illustration of an all-electric power drive upshift.

FIGS. 8, 9 and 10 illustrate a variant of the invention in which the frictional-locking bypass shift element 12 engages at an element other than the planetary transmission 10. Thus, in FIGS. 8, 9 and 10, the frictional-locking bypass shift element 12 is arranged between the sun gear 14 and the bar or planetary carrier 17.

In this case, FIG. 9 illustrates the power flow with all-electric driving, if the separating clutch 11 is open, with a flow of idle power through the first sub-transmission 6, while FIG. 10 visualizes the power flow upon the execution of an all-electric power drive upshift.

Under the assumption that, upon all-electric driving in FIG. 9, the third gear (with a transmission ratio of i3=2.0) is engaged in the first sub-transmission 6, and the second gear (with a transmission ratio of i2=3.0) is engaged in the second sub-transmission 7, at a stationary transmission ratio of i=−2.0, and that the electric motor 2 is operated with a rotational speed of 3500 rpm and a turning moment of 100 Nm, a rotational speed n-GE9 of 2100 rpm and a turning moment M-GE9 of 300 Nm arises at the input shaft 9 of the second sub-transmission 7. At the transmission output shaft 18, a rotational speed n-AB of 700 rpm and a torque M-AB of 500 Nm arises. As already stated, idle power flows through the first sub-transmission 6, whereas the rotational speed n-GE8 of the input shaft 8 of the first sub-transmission 6 amounts to 1400 rpm and a torque M-GE8 of 200 Nm is transferred. The idle power then amounts to 28 kW.

Upon the execution of the power drive upshift in all-electric driving mode in accordance with FIG. 10, the rotational speed n-GE9 of the input shaft 9 of the second sub-transmission 7 in turn amounts to 2100 rpm; a turning moment M-GE9 of 100 Nm is transferred by the same. The rotational speed n-AB at the output 4 in turn amounts to 700 rpm; the turning moment M-AB at the output amounts to 300 Nm. The torque M-12 to be transferred by the frictional-locking bypass shift element 12 increases to 100 Nm with a slip speed n-12 of 1400 rpm. The power loss at the bypass shift element 12 amounts to 14 kW.

Figure 11:
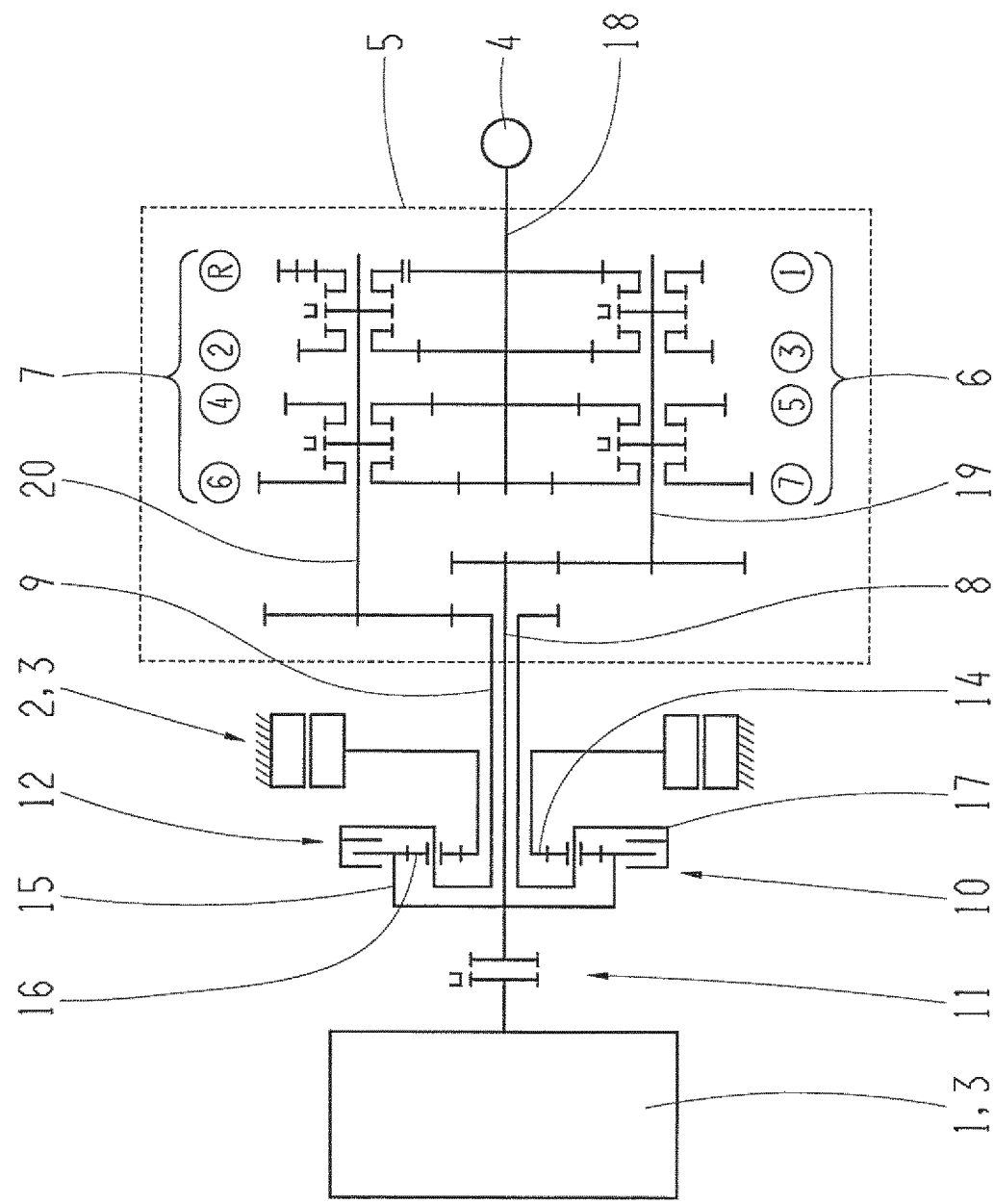
FIG. 11 is a schematic diagram of a third drive unit for a hybrid vehicle.
Figure 12:
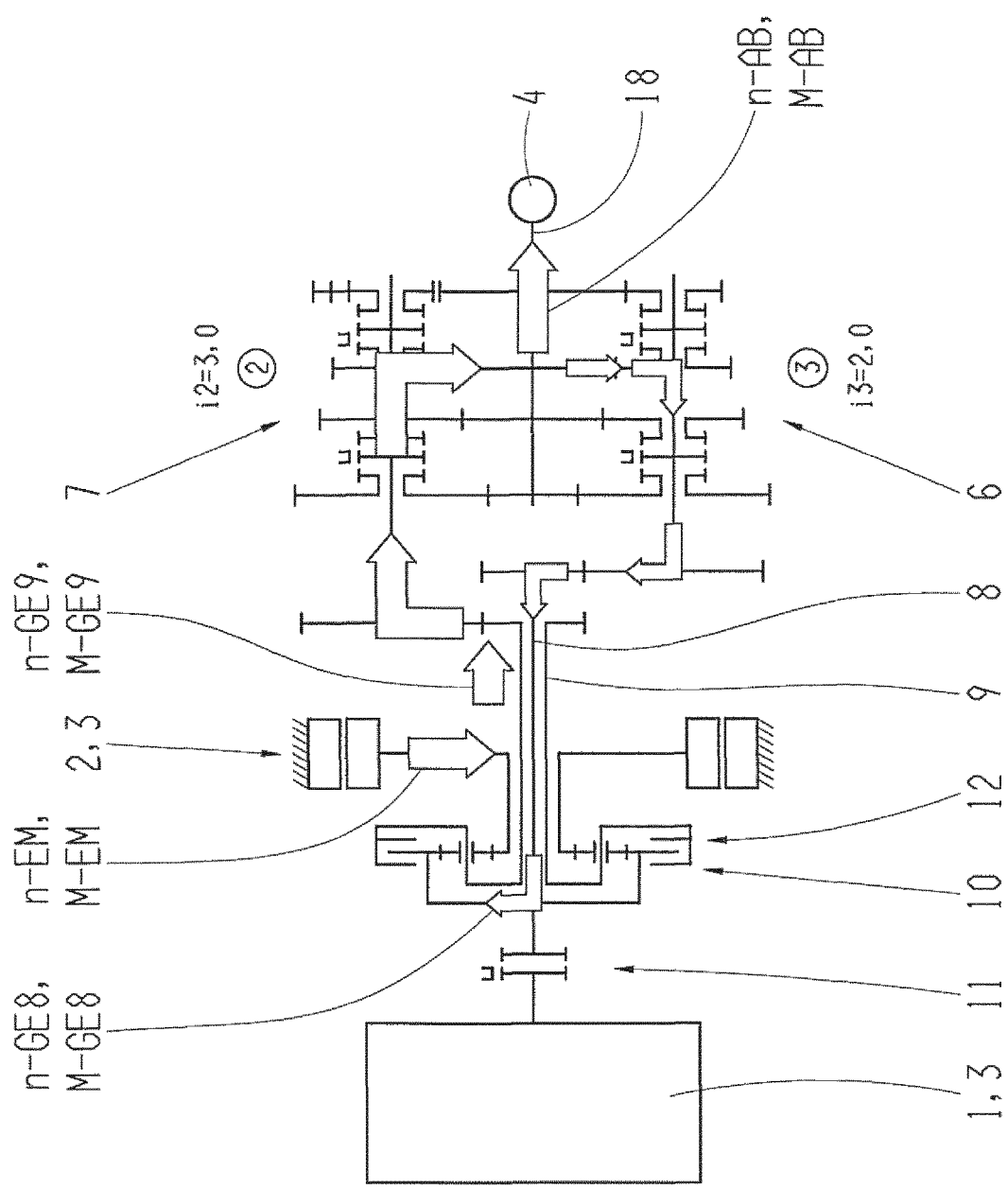
FIG. 12 is the schematic diagram of FIG. 11 for the illustration of an all-electric driving mode.
Figure 13:
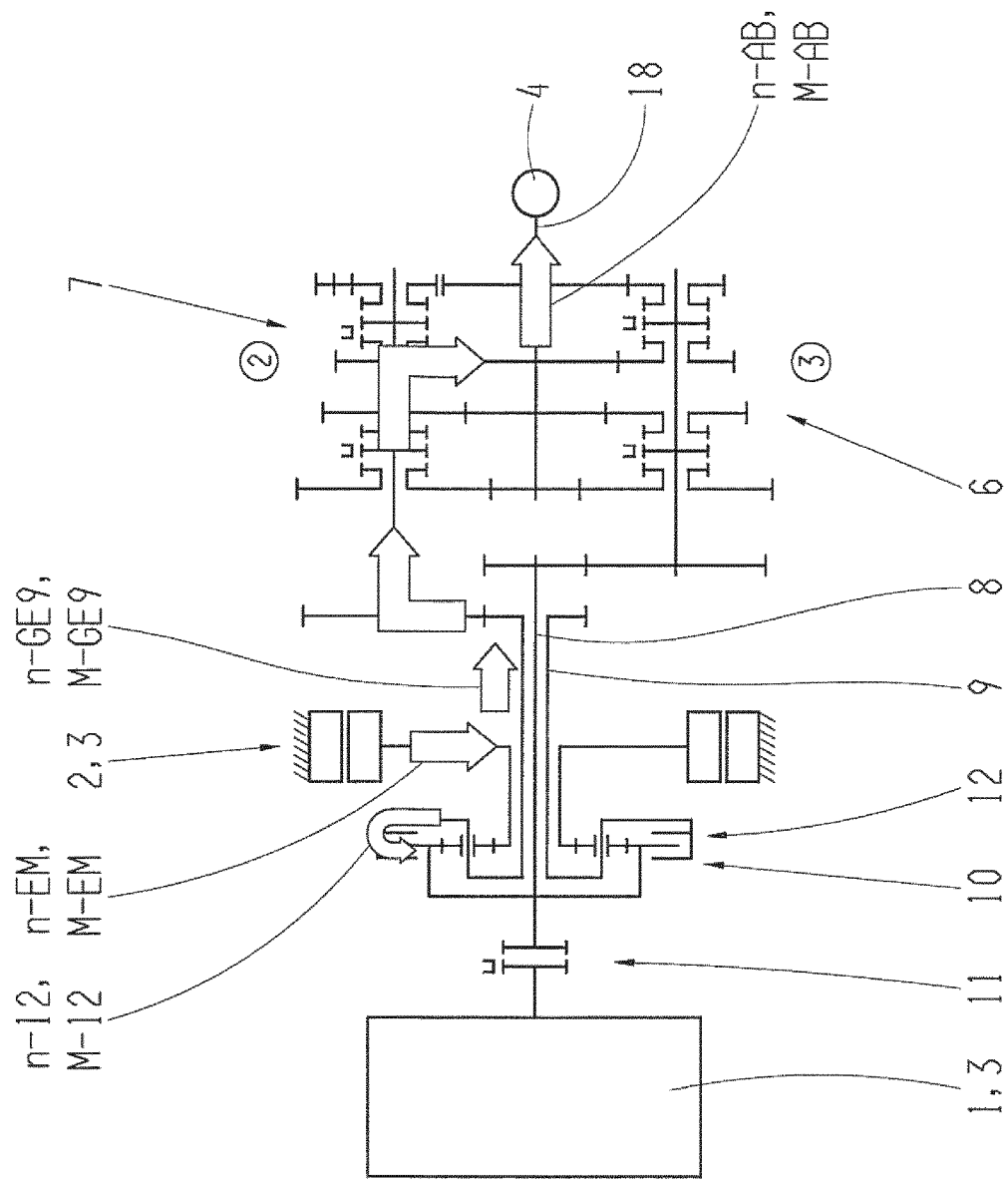
FIG. 13 is the schematic diagram of FIG. 11 for the illustration of an all-electric power drive upshift.

FIGS. 11, 12 and 13 show an additional variant of the invention, whereas, in FIGS. 11, 12, 13, the frictional-locking bypass shift element 12 is arranged at the planetary transmission 10 in a different manner; that is, between the ring gear 15 and the bar or planetary carrier 17. For this case, FIG. 12 illustrates the power flow during all-electric driving; FIG. 13 illustrates the power flow upon the execution of a power drive upshift in all-electric driving mode.

Under the assumption that, upon all-electric driving in FIG. 12, the third gear (with a transmission ratio of i3=2.0) is engaged in the first sub-transmission 6, and the second gear (with a transmission ratio of i2=3.0) is engaged in the second sub-transmission 7, at a stationary transmission ratio of i=−2.0), and that the electric motor 2 is operated with a rotational speed of 3500 rpm and a turning moment of 100 Nm, a rotational speed n-GE9 of 2100 rpm and a turning moment M-GE9 of 300 Nm arises at the input shaft 9 of the second sub-transmission 7. At the transmission output shaft 18, a rotational speed n-AB of 700 rpm and a torque M-AB of 500 Nm arises. Idle power in turn flows through the sub-transmission 6, whereas the rotational speed n-GE8 of the input shaft 8 of the first sub-transmission 6 amounts to 1400 rpm and a torque M-GE8 of 200 Nm is transferred. The idle power then amounts to 28 kW.

Upon the execution of the power drive upshift in all-electric driving mode in accordance with FIG. 10, the rotational speed n-GE9 of the input shaft 9 of the second sub-transmission 7 in turn amounts to 2100 rpm; a turning moment M-GE9 of 100 Nm is transferred by the same. The rotational speed n-AB at the output 4 in turn amounts to 700 rpm; the turning moment M-AB at the output amounts to 300 Nm.

The torque M-12 to be transferred by the frictional-locking bypass shift element 12 increases to 200 Nm with a slip speed n-12 of 700 rpm. The power loss at the bypass shift element 12 amounts to 14 kW.

For the drive units of FIGS. 8 to 10 and 11 to 13, the methods described in connection with FIGS. 1 to 7 remain unchanged. As described above, this only gives rise to varying turning moments and differential rotational speeds at the frictional-locking bypass shift element 12.

Figure 14:
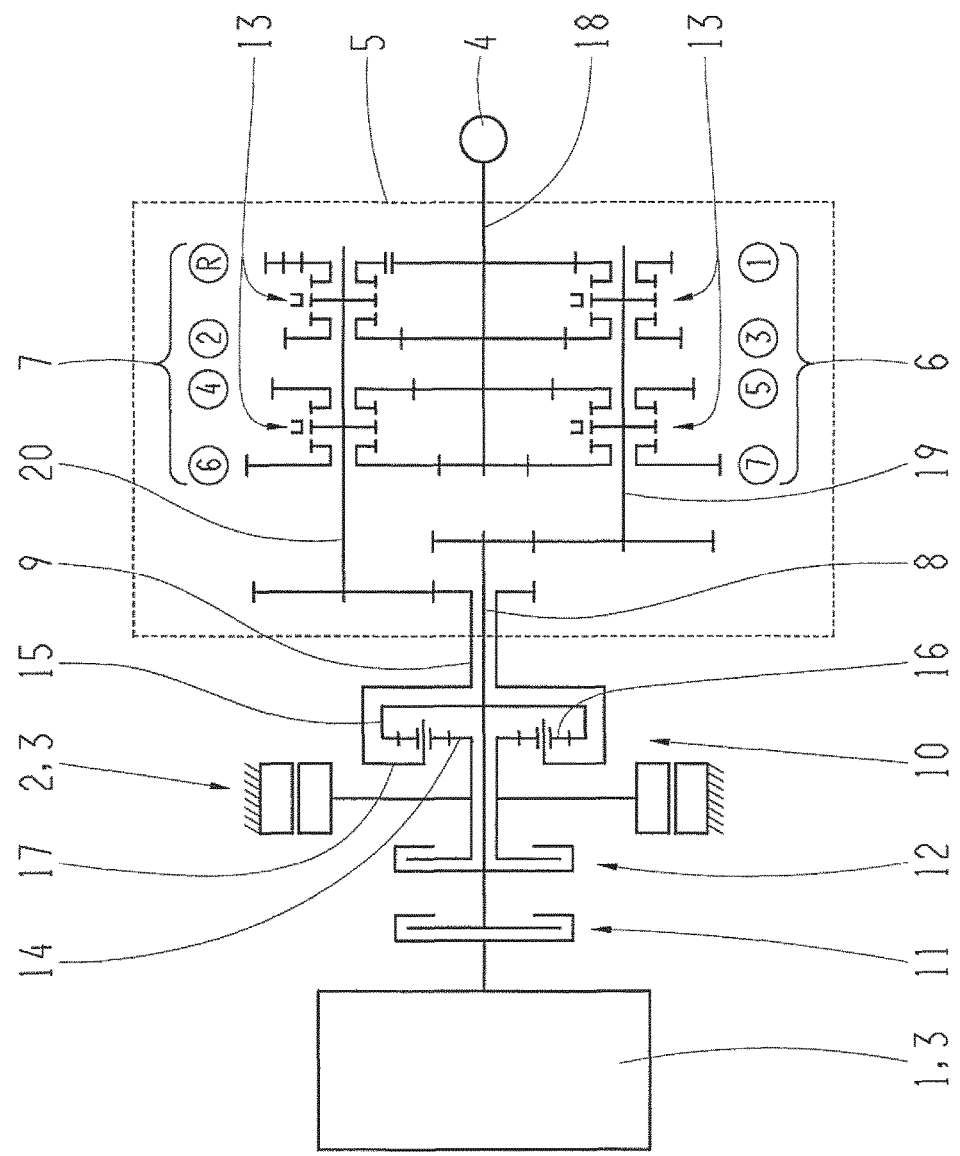
FIG. 14 is a schematic diagram of a fourth drive unit for a hybrid vehicle.

Although the design of the separating clutch 11 as a positive-locking separating clutch is preferred, as can be inferred from FIG. 14, the separating clutch 11 may also be designed as a frictional-locking separating clutch. The methods remain unchanged. However, compared to the use of a positive-locking separating clutch 11 in accordance with FIG. 14, the use of a positive-locking separating clutch 11 in accordance with FIGS. 1 to 13 is preferred, since the structural design of the drive unit can be simplified.

As already stated, the connection of the internal combustion engine 1, the electric motor 2 and the second sub-transmission 7 at the planetary transmission 10 may vary. Thus, for example, in FIG. 1, the electric motor 2 is engaged at the ring gear 15 and the internal combustion engine 1 with a locked separating clutch 11, just like the input shaft 8 of the first sub-transmission 6 at the sun gear 14. With a locked separating clutch 11, the internal combustion engine 1 and the input shaft 8 of the first sub-transmission 6 are always engaged at the same element of the planetary transmission 10.

Modifications and variations can be made to the embodiments illustrated or described herein without departing from the scope and spirit of the invention as set forth in the appended claims.

REFERENCE SIGNS

1 Internal combustion engine
2 Electric motor
3 Drive assembly
4 Output
5 Transmission
6 Sub-transmission
7 Sub-transmission
8 Input shaft
9 Input shaft
1 Planetary transmission
11 Separating clutch
12 Bypass shift element
13 Shift element
14 Sun gear
15 Ring gear
16 Planetary gear
17 Planetary carrier
18 Output shaft
19 Lay shaft
20 Lay shaft

The invention claimed is:

1. A drive unit for a hybrid vehicle, comprising:
a drive assembly with an internal combustion engine, an electric motor, and a transmission with at least a first sub-transmission parallel to a second sub-transmission between the drive assembly and an output;
the electric motor coupled to an input shaft of the first sub-transmission and an input shaft of the second sub-transmission through a planetary transmission;
the internal combustion engine able to couple to the input shaft of the first sub-transmission through a clutch and, when the clutch is locked, is coupled to a same element of the planetary transmission as the input shaft of the first sub-transmission;
a bypass shift element configured in such a manner that: (a) when the bypass shift element is locked, a torque-proof connection between the electric motor, the input shaft of the first sub-transmission and the input shaft of the second sub-transmission exists, and (b) with the bypass shift element open, the torque-proof connection between the electric motor and the two input shafts of the two sub-transmission does not exist;
wherein the clutch is a frictional-locking or positive-locking separating clutch, and the bypass shift element is a frictional-locking bypass shift element; and
the frictional-locking bypass shift element is interactively configured with the transmission as a power-shifting element for execution of a power shift in an all-electric driving mode, wherein:
upon execution of a drive upshift and upon execution of a coast downshift, the power-shifting element is switched on or locked; and
upon the execution of a drive downshift and upon the execution of a coast upshift, the power-shifting element is switched off or opened.

2. A method for operating the drive unit for a hybrid vehicle, wherein the drive unit comprises:
a drive assembly with an internal combustion engine, an electric motor, and a transmission with at least a first sub-transmission parallel to a second sub-transmission between the drive assembly and an output;
the electric motor coupled to an input shaft of the first sub-transmission and an input shaft of the second sub-transmission through a planetary transmission;
the internal combustion engine able to couple to the input shaft of the first sub-transmission through a clutch and, when the clutch is locked, is coupled to a same element of the planetary transmission as the input shaft of the first sub-transmission;
a bypass shift element configured with the planetary transmission in such a manner that: (a) when the bypass shift element is locked, a torque-proof connection between the electric motor, the input shaft of the first sub-transmission and the input shaft of the second sub-transmission exists, and (b) with the bypass shift element open, the torque-proof connection between the electric motor and the two input shafts of the two sub-transmission does not exist;
the method comprising:
using the frictional-locking bypass shift element as a power-shifting element for execution of a power shift in all-electric driving mode, wherein,
upon the execution of a drive upshift and upon the execution of a coast downshift, the power-shifting element is closed; and
upon the execution of a drive downshift and upon the execution of a coast upshift, the power-shifting element is opened.

3. The method according to claim 2, wherein for the execution of a drive upshift or a coast downshift in all-electric driving mode, when the frictional-locking bypass shift element and the separating clutch are both open and one gear is engaged in both sub-transmissions:
initially, bringing the frictional-locking bypass shift element into engagement to unload the first sub-transmission;
subsequently, the engaged gear in the first sub-transmission is disengaged;
thereupon, the frictional-locking bypass shift element is synchronized; and
subsequently, the frictional-locking bypass shift element is locked.

4. The method according to claim 2, wherein for the execution of a drive downshift or a coast upshift in all-electric driving mode, when the frictional-locking bypass shift element is locked, the separating clutch is open, one gear is engaged in the second sub-transmission, and the first sub-transmission is in neutral:
initially, reducing a torque-transfer capacity of the frictional-locking bypass shift element by bringing the frictional-locking bypass shift element into slip;

whereas, through adjustment of rotational speed of the electric motor, the first sub-transmission is synchronized to a target gear of the power shift to be executed;

thereupon, the target gear is engaged in the first sub-transmission; and subsequently, the frictional-locking bypass shift element is opened.

5. The method according to claim 2, wherein for coupling of the internal combustion engine to the transmission through the positive-locking separating clutch with assistance of the frictional-locking bypass shift element:

synchronizing rotational speed of the input shaft of the first sub-transmission to rotational speed of the internal combustion engine while maintaining pulling force at the output.

6. The method according to claim 5, wherein for coupling of the internal combustion engine in all-electric driving mode when the frictional-locking bypass shift element is locked, the separating clutch is open, one gear is engaged in the second sub-transmission, and the first sub-transmission is in neutral:

initially, reducing torque-transfer capacity of the frictional-locking bypass shift element by bringing the frictional-locking bypass element into slip;

whereas, through an adjustment of rotational speed of the electric motor, the positive-locking separating clutch is synchronized;

thereupon, the positive-locking separating clutch is locked;

subsequently, through a load transfer to the internal combustion engine, the frictional-locking bypass shift element is unloaded;

thereupon, the first sub-transmission is synchronized to a suitable gear and this gear is engaged in the first sub-transmission; and subsequently, through a further load transfer to the internal combustion engine, the electric motor is unloaded.

* * * * *